Patented Nov. 26, 1940

2,223,272

UNITED STATES PATENT OFFICE 2,223,272

LUBRICANT COMPOSITION AND METHOD OF LUBRICATION

Theodore G. Roehner, Malverne, and Carroll N. Rill, Jackson Heights, N. Y. assignors to Socony-Vacuum Oil Company, Incorporated, New York, N. Y., a corporation of New York No Drawing. Application December 11, 1937, Serial No. 179,255

9 Claims. (Cl. 252—40)

This invention is concerned with the lubrication of heavy machinery operated under somewhat elevated pressures, at temperatures sometimes near the boiling point of water, and under conditions such that the parts to be lubricated are continuously drenched with water. The invention is specifically concerned with a novel method of lubricating such equipment, and with novel compounds capable of unusually good performance under such conditions.

Particularly typical of the type of machinery lubrication problems with which this invention is concerned, is the lubrication of water-cooled roll necks on strip steel rolling mills of the usual low speed type. In this equipment the roll necks are mounted in plain bearings of babbitt, or bearings using brass inserts, or various bronzes. The speeds are not excessive, but the intensity of loading is high because the necessary reduction of the rolled strip is gained by pressure applied to the roll necks through their bearings. As a complicating feature, the bearing when in operation is heated not only by such heat as may be developed in its normal operation, but by heat from the nearby hot metal being processed, and to cool the bearings they are continuously drenched with water. This results in the bearing being held at temperatures which are usually low, but which sometimes approach the boiling point of water. The greases to be used may be applied most conveniently in the form of a block or solid lubricant, and practically all of the equipment of this nature is fitted to be lubricated with block greases. These block greases to properly lubricate and maintain lubrication under the conditions of operation must be capable of preferentially wetting heated metal in the presence of water, which may be at temperatures near its boiling point, and at the same time the greases must be capable of maintaining a persistent heavy film of high lubricant properties. Previously used greases commonly consist entirely of animal fats partially saponified. No one of these greases has been more than partially competent. Under such conditions the usual soda soap base greases wash out without giving service, and the ordinary lime soap base greases, while not washing so badly, normally appear incapable of maintaining lubrication. Additionally, formerly used greases do not so coat the roll necks in bearings during use that when shut down they are able to protect the roll necks and bearings from serious rusting. This fault is particularly bad, since the metallurgical nature and heat treatment of the roll neck materials is such as to invite rusting.

The principal object of this invention is the provision of a method of lubrication of such devices, and the provision of a solid, mineral oil containing block grease adapted for use under such conditions of high load and continuous water drenching, substantially anhydrous, of proper melting point, capable of preferentially wetting heated metal in the presence of water, capable of maintaining a persistent heavy film of high lubricant properties, and of such a nature that it may be consumed in lubrication at a controlled rate not dependent upon the amount of water washing and other surrounding circumstances.

This invention is based upon the discovery that greases combining such properties to a high degree may be compounded from the ingredients and in the manner hereinafter described, and that the use of these greases in lubrication, as for example of roll necks, will result in decreased grease consumption, decreased power consumption, maintenance of lubricating film under the conditions of operation, and maintenance of lubricating film in a sufficient amount to prevent rusting and similar corrosion of metal parts when shut down.

Greases for these uses may be compounded from heavy mineral oils, preferably of an asphaltic nature, and soaps of certain fatty materials completely saponified with a mixture of lime and soda, in which the lime and soda are so proportioned as to result in the desired characteristics of the grease with respect to preferential wetting of hot metal in the presence of water, and maintenance of lubricating film under those conditions. These greases may be used alone, or there may be compounded with them a certain amount of graphite to assist in the lubrication. The mineral oil content of the greases will be derived from heavy mineral oil stocks, and for this purpose there may be used cylinder stocks and similar heavy lubricating oils or residual or asphaltic materials of appropriate viscosities. As an example of oils which are convenient for these uses, there may be mentioned the usual cylinder stocks. There may also be mentioned asphaltic materials of residual nature such as the heavy mineral oil stocks commonly known as "black oils," which may either be crude residues or reduced residues of heavy oils from cracking operations. Mixtures of heavier asphaltic oils when properly reduced in viscosity may also be used. For example, it is convenient to use a mixture of somewhere near equal proportions of an asphaltic pitch of about 170° F. ring and ball melting point, and a light neutral oil having a viscosity of about 100" Saybolt Universal at 100° F. The mineral oil content of the grease may vary rather widely in viscosity characteristics, but for most conditions of application it is usually preferable to have a mineral oil content which has a viscosity in the neighborhood of about 400" Saybolt Universal at 210° F. The fats and fatty acid materials which may be used are those capable of giving soaps of the proper degree of hardness and of the proper water solubilities. As examples of fats and fatty acid materials which may be used there may be mentioned hydrogenated sperm oil, hydrogenated fish oil fatty acids, degras, and palm oil. Hydrogenated sperm oil is preferably used in the form of a commercial product known as Spermafol No. 52, which is a hydrogenated sperm oil having a titre of about 52. Hydrogenated fish oil fatty acids are conveniently used in the form of a commercial product known as Hydrofol Fatty Acids No. 50–51. These are separated fatty acids from hydrogenated fish oil having a titre of about 50–51. Degras, if it be used, may be the common degras of commerce, and the palm oil recommended for use is the usual Niger Palm Oil of commerce. Also used in compounding are graphite, lime flour, and caustic soda, and for these the usual articles commercially current may be used. In the formulation shown following, and in the claims, the computation of lime flour and caustic soda is on a dry basis, while in the actual compounding the caustic soda is used in the form of a concentrated (about 50%) solution in water. It is to be understood that the usual alkali metal equivalents of sodium may be used in its place, and also that the other alkaline earth metals may replace the lime, in whole or in part.

The procedure of compounding is in general quite similar to that of the usual manufacture of block greases. The oil and fatty acids are mixed together in a kettle of the usual type and brought to a temperature of about 250° F., and the caustic soda slurry is added, the temperature being held during this saponification operation at about 250° F. About one-half hour after the addition of soda, the lime flour is added and further saponification carried on at about 250° F. for about two hours. The temperature is then slowly raised during about one hour to 350° F., and further raised during a following period of about one-half hour to about 400° F. The mixture is then held at 400° F. until a small sample rapidly cooled becomes quite hard. This usually takes about one and one-half hours. The mixture is then partially cooled, drawn, and packaged. If graphite is used in the finished grease, as is usually preferred, the proper amount of graphite may be added either to the original oil fat mixture before saponification or at any convenient point during saponification. As examples of successful formulae of greases which have shown results in practical commercial use, considerably improved over any grease heretofore applied for the same use, there may be cited the following formulae:

Example I

| | Percent by weight |
|---|---|
| Spermafol No. 52 | 28.6 |
| Hydrofol Fatty Acids No. 50–51 | 3.6 |
| Black oil | 56.0 |
| Graphite | 5.0 |
| Dry caustic soda | 1.3 |
| Lime flour | 5.5 |

Example II

| | Percent by weight |
|---|---|
| Asphalt oil base | 24.5 |
| 100" neutral oil | 24.5 |
| Hydrofol Fatty Acids No. 50–51 | 15.0 |
| Common degras | 25.0 |
| Lime flour | 5.4 |
| Dry caustic soda | 0.6 |
| Graphite | 5.0 |

Example III

| | Percent by weight |
|---|---|
| Asphalt oil base | 24.5 |
| 100" neutral oil | 24.6 |
| Common degras | 15.2 |
| Niger palm oil | 25.2 |
| Dry caustic soda | 1.2 |
| Lime flour | 4.3 |
| Graphite | 5.0 |

Greases made in accordance with these formulae have been found to be possessed of unusually good characteristics for the service for which they are designed, and lubrication with these greases has been found to be capable of considerably better results than with any of the greases heretofore used for the same purpose. These greases possess to an unusually high degree the capabilities of forming and maintaining a lubricating film of high efficiency on the heated metal surface to be lubricated in the presence of the constant stream of water thrown against the bearings. They have been found to be capable of giving more continuous hours of operation, and of operating at lower bearing temperatures. Fewer "hot necks" are found to occur when this method of lubrication is used, and even in the absence of "hot necks," which frequently cause shut downs with other methods of lubrication, rolling mill operators are able to operate their rolls at high speed for a considerably longer time before temperature rises become definitely apparent when using the method of lubrication and greases of the type herein disclosed. The use of this method of lubrication and greases has been found to effect a reduction in the amount of bearing wear, and in several cases the wear experienced is of a nature of 1/3 that experienced with the products formerly used for this purpose. A particular objection to the greases formerly used, as hereinbefore pointed out, is that roll necks often became rusted during shut downs, particularly during shut downs over the weekend. The film provided in the method of lubrication herein disclosed is sufficiently adhesive and persistent so that at the time operations are stopped, a film remains which is capable of effectively preventing the rusting of the necks over a very considerable period of shut down. Of considerable importance are the use characteristics of these greases. The use or consumption of greases formerly used appeared to be largely dependent upon other things besides the nature of the grease, as for example its loss in washing away by water. Greases of the type herein described are possessed of controllable use characteristics and effect a very considerable economy in grease consumption.

While the attainment of the maximum benefits of this method of lubrication are dependent upon the compounding of the grease and are most easily obtained by use of the various formulae set forth above, a considerable amount of the benefits and improvement over former methods of lubrication may be obtained by greases which, while having the same general characteristics, use different proportions in the formulae. As a definition of the range of compositions using the previously described materials, in which benefits over the prior art may be obtained, the following tabulation shows by way of limiting ranges, the changes of proportion which may be made and still result in the production of a relatively satisfactory grease, which may be used in this method of lubrication:

*Example IV*

| | Percent |
|---|---|
| Fatty materials | 25 to 45 |
| Asphaltic mineral oil | 66 to 40 |
| Dry caustic soda | 1 to 2 |
| Lime flour | 4 to 7½ |
| Graphite | 4 to 6 |

When properly compounded, these greases are smooth, black, homogeneous, non-fibrous, solid greases possessed of a texture and appearance considerably better than conventional greases of the same hardness. They are quite low in moisture. They are low in free alkali and free acid, usually showing a free alkali content of about 3% maximum, indicating a complete saponification, and in proportions within the limits shown in Example IV, the bases and fatty materials should be so proportioned as to attain this complete saponification. The relative proportions of the particular ingredients comprising the fatty materials may be varied, and for example can range from proportions of the nature of those shown in the specification examples to mixtures where the fats of Examples I and II, for instance, are present in substantially equal amounts. Dependent somewhat upon the fats used, and other variables, as is usual in grease manufacture, the Ubbelhode melting point of these greases varies from about 220° F. upward toward 300° F., and they are possessed of an A. S. T. M. cone penetration in the unworked state of from 15 to upward of 50. Due to the possession of these melting points and consistencies they are capable of a proper rate of feed and consumption, since most greases prepared from formulae other than those disclosed herein either melt down under the conditions of use, or else are too hard to be properly applied.

While certain numerical data and examples have been set forth herein, it is to be understood that this invention is not limited thereby or thereto, the examples being shown by way of illustration only, and the invention being subject only to those limitations expressed in the following claims.

We claim:

1. A solid substantially anhydrous lubricating composition having a melting point substantially above the boiling point of water, of low solubility in hot water, and capable of preferentially wetting heated metal in the presence of water produced by blending together from 40 to 66 parts by weight of viscous asphaltic mineral oil and from about 25 to 45 parts by weight of fatty materials at a temperature of about 250° F., and adding thereto lime and soda in amounts sufficient to effect substantially complete saponification, the proportions of soda and lime varying from about 1 part by weight of sodium hydroxide to about 7½ parts lime, to about 2 parts sodium hydroxide to about 4 parts lime, the grease compounding being finished at a temperature of approximately 400° F. to produce a hard block grease.

2. A solid substantially anhydrous lubricating composition having a melting point substantially above the boiling point of water, of low solubility in hot water, and capable of preferentially wetting heated metal in the presence of water produced by blending together from 40 to 66 parts by weight of viscous asphaltic mineral oil and from about 25 to 45 parts by weight of one or more fatty materials selected from the group consisting of hydrogenated sperm oil, fatty acids from hydrogenated fish oil, degras, and palm oil, at a temperature of about 250° F., and adding thereto lime and soda in amounts sufficient to effect substantially complete saponification, the proportions of soda and lime varying from about 1 part by weight of sodium hydroxide to about 7½ parts lime, to about 2 parts sodium hydroxide to about 4 parts lime, the grease compounding being finished at a temperature of approximately 400° F. to produce a hard block grease.

3. A solid substantially anhydrous lubricating composition having a melting point substantially above the boiling point of water, of low solubility in hot water, and capable of preferentially wetting heated metal in the presence of water, produced by blending together from 40 to 66 parts by weight of viscous asphaltic mineral oil and from about 25 to 45 parts by weight a fatty material consisting substantially of hydrogenated sperm oil with added fatty acids from hydrogenated fish oil at a temperature of about 250° F., and adding thereto lime and soda in amounts sufficient to effect substantially complete saponification, the proportions of soda and lime varying from about 1 part by weight of sodium hydroxide to about 7½ parts lime, to about 2 parts sodium hydroxide to about 4 parts lime, the grease compounding being finished at a temperature of approximately 400° F. to produce a hard block grease.

4. A solid substantially anhydrous lubricating composition having a melting point substantially above the boiling point of water, of low solubility in hot water, and capable of preferentially wetting heated metal in the presence of water, produced by blending together from 40 to 66 parts by weight of viscous asphaltic mineral oil and from about 25 to 45 parts by weight of a fatty material consisting of substantially equal proportions of degras and fatty acids from hydrogenated fish oil at a temperature of about 250° F., and adding thereto lime and soda in amounts sufficient to effect substantially complete saponification, the proportions of soda and lime varying from about 1 part by weight of sodium hydroxide to about 7½ parts lime, to about 2 parts sodium hydroxide to about 4 parts lime, the grease compounding being finished at a temperature of approximately 400° F. to produce a hard block grease.

5. A solid substantially anhydrous lubricating composition having a melting point substantially above the boiling point of water, of low solubility in hot water, and capable of preferentially wetting heated metal in the presence of water produced by blending together from 40 to 66 parts by weight of viscous asphaltic mineral oil and from about 25 to 45 parts by weight of a fatty material consisting of substantially equal proportions of palm oil and degras at a temperature of about 250° F., and adding thereto lime and soda in amounts sufficient to effect substantially complete saponification, the proportions of soda and lime varying from about 1 part by weight of sodium hydroxide to about 7½ parts lime, to about 2 parts sodium hydroxide to about 4 parts lime, the grease compounding being finished at a temperature of approximately 400° F. to produce a hard block grease.

6. A solid substantially anhydrous lubricating composition having a melting point substantially above the boiling point of water, of low solubility in hot water, and capable of preferentially wetting heated metal in the presence of water, produced by blending together from 40 to 66 parts by weight of an oil which is a mixture of an asphalt of about 170° F. melting point and of a viscous oil having a viscosity of about 100″ Saybolt Universal at 100° F. and from about 25 to 45 parts by weight of one or more fatty materials selected from the group consisting of hydrogenated sperm oil, fatty acids from hydrogenated fish oil, degras, and palm oil, at a temperature of about 250° F., and adding thereto lime and soda in amounts sufficient to effect substantially complete saponification, the proportions of soda and lime varying from about 1 part by weight of sodium hydroxide to about 7½ parts lime, to about 2 parts sodium hydroxide to about 4 parts lime, the grease compounding being finished at a temperature of approximately 400° F. to produce a hard block grease.

7. A grease for use in highly loaded water drenched bearings comprising the product made by compounding together the following materials:

| | Per cent |
|---|---|
| Hydrogenated sperm oil | 28.6 |
| Hydrogenated fish oil fatty acids | 3.6 |
| Black mineral oil | 56.0 |
| Graphite | 5.0 |
| Dry caustic soda | 1.3 |
| Lime flour | 5.5 | all by weight, the saponification being finished at a temperature of approximately 400° F.

8. A grease for use in highly loaded water drenched bearings comprising the product made by compounding together the following materials:

| | Per cent |
|---|---|
| Asphalt oil base | 24.5 |
| 100″ neutral oil | 24.5 |
| Hydrofol Fatty Acid 50-51 | 15.0 |
| Common degras | 25.0 |
| Lime flour | 5.4 |
| Dry caustic soda | 0.6 |
| Graphite | 5.0 | all by weight, the saponification being finished at a temperature of approximately 400° F.

9. A grease for use in highly loaded water drenched bearings comprising the product made by compounding together the following materials:

| | Per cent |
|---|---|
| Asphalt oil base | 24.5 |
| 100″ neutral oil | 24.6 |
| Common degras | 15.2 |
| Niger palm oil | 25.2 |
| Dry caustic soda | 1.2 |
| Lime flour | 4.3 |
| Graphite | 5.0 | all by weight, the saponification being finished at a temperature of approximately 400° F.

THEODORE G. ROEHNER.
CARROLL N. RILL.